May 22, 1962   J. C. BYSTRICKY ET AL   3,035,661
PUMP AND TIMER FOR A CENTRALIZED LUBRICATION SYSTEM
Filed March 20, 1959

INVENTORS
JOSEPH C. BYSTRICKY
WILLIAM G. JENNINGS
JOSE L. LUNA.

BY
JOHN C. BLACK
ATTORNEY

INVENTORS
JOSEPH C. BYSTRICKY
WILLIAM G. JENNINGS
JOSE L. LUNA

BY JOHN C. BLACK
ATTORNEY.

United States Patent Office 3,035,661
Patented May 22, 1962

3,035,661
PUMP AND TIMER FOR A CENTRALIZED
LUBRICATION SYSTEM
Joseph C. Bystricky, Crystal Lake, William G. Jennings, Evanston, and Jose L. Luna, Chicago, Ill., assignors to Stewart-Warner Corporation, Chicago, Ill., a corporation of Virginia
Filed Mar. 20, 1959, Ser. No. 800,722
9 Claims. (Cl. 184—7)

This invention relates to a centralized, automatic lubrication system and more particularly to a compact, integral pump and timer for supplying measured amounts of lubricant periodically to the various bearing surfaces of a machine element.

Many machines used in agricultural or industrial applications today are operated continuously for long periods of time. Continuous use of such machines requires periodic lubrication of the bearings and other moving parts in order to insure that the machines will operate adequately without excessive wear. In order to supply adequate lubrication, there has been developed various systems for automatically lubricating these machines periodically which eliminates the need for continuous supervision. However, the known devices for providing automatic and periodic lubrication from a central system are rather bulky and unnecessarily complicated. In addition, many of the systems employ arrangements in which the lubricant is subjected to continual high pressure which often results in leaks and bursting of the supply lines.

It is therefore an object of this invention to provide a fully automatic, centralized lubrication system wherein the supply line is subjected to high pressure lubricant only during the period when the bearings are to be lubricated.

It is a further object of this invention to provide an automatic, centralized lubrication system wherein integral, mechanical, timing and positive pump means are employed for raising the pressure within the supply line at predetermined set intervals whereby the bearings are lubricated only during such intervals.

It is a further object of this invention to provide an improved centralized, automatic lubrication system wherein the mechanical timing means includes integral pressure relief means for insuring that the high pressure lubricant within the supply line will be vented if the pressure exceeds a predetermined value.

Other objects and advantages of this invention will be pointed out from the following detailed description and claims when taken in connection with the accompanying drawings, which disclose, by way of example, the principles of this invention and the best mode which has been contemplated of applying these principles.

In general, the apparatus of this invention comprises a highly compact positively driven pump and timer for periodically lubricating a machine element from a reservoir having a supply of lubricant therein. The apparatus includes a supply line for connecting the reservoir with any number of machine elements, such as bearings. A single drive shaft operates the positive-type pump for removing the lubricant from the reservoir and delivering it to the supply line. A bypass line is connected to the supply line for venting or allowing the return flow of lubricant from the supply line to the reservoir. Control valve means are positioned within the bypass line for controlling this return flow, and a measuring valve is positioned between the supply line and the individual machine element whereby the measuring valve is operated by increased pressure within the line to deliver a measured amount of lubricant to the individual elements. A gear train positioned adjacent the pump means is driven by the single drive shaft to rotate a suitable cam. The cam operates at predetermined intervals to close the control valve positioned within the bypass line for increasing the pressure within said line to effect periodic lubrication of the various machine elements. The same control valve incorporates therein pressure relief means to reduce the pressure within the supply line if it reaches a predetermined excessive level during the lubricating period, regardless of the position of said cam.

Figure 1:
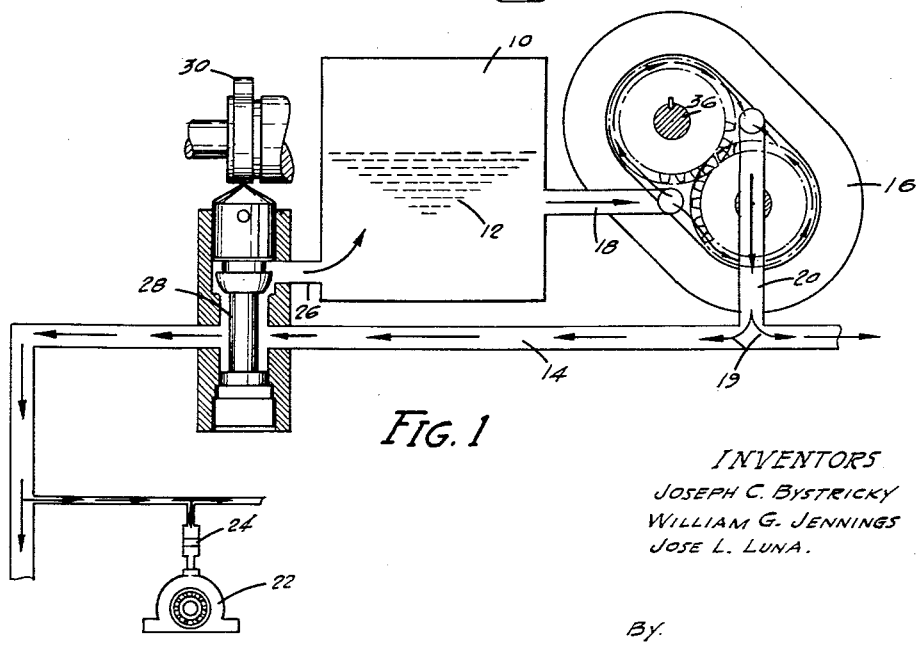
FIG. 1 is a partial schematic diagram of the lubricating system of the present invention.

Referring to the drawings, FIG. 1 shows a partial schematic view of the lubrication system forming the present invention. A suitable lubricant reservoir 10 is provided with lubricant 12 such as grease or oil, the lubricant being supplied to a positively driven gear pump 16 by means of inlet conduit 18. The gear pump 16 delivers the lubricant 12 from reservoir 10 to a lubricant supply line 14 through outlet conduit 20. As indicated by the arrows 19, the lubricant may pass in either direction through the lubricant supply line 14, where the lubricant is delivered to any one of a number of machine elements such as that indicated at 22. A conventional measuring valve 24 is employed, such that upon a certain predetermined pressure being produced within the supply line, a measured quantity of lubricant will pass through valve 24 to the machine element 22. The particular measuring valve forms no part of the present invention and may be of the type shown in U.S. Patent 2,532,269 issued to Ernest W. Davis. This type of valve will allow the passage of lubricant only upon sufficient rise of pressure within the lubricant supply line 14. The system is further provided with a vent or return flow line 26 which allows the lubricant to pass from the supply line 14 back to the lubricant reservoir 10 where it is returned to gear pump 16 in somewhat of a closed path. In order that the machine element 22 may be periodically lubricated, there is provided a control valve 28 assembly which is positioned within the vent or return flow line 26. A suitable drive means is provided for rotating a cam 30 to periodically open and close the control valve in a reciprocatory fashion against the bias of the spring not shown. As the valve periodically closes, the pressure within the supply line 14 rises instantaneously to a point where the measuring valve 24 opens to supply a predetermined quantity of high pressure lubricant to the machine element 22. It is important to note that there is no reservoir or other accumulator required in the present invention to receive the high pressure lubricant prior to discharging a portion of the lubricant from the supply line to the machine elements. As soon as the cam 30 has moved a distance such that the cam lobe is no longer in contact with the cam follower, the valve 28 will open, allowing the high pressure lubricant to be vented into reservoir 12.

The particular structure employed for achieving the automatic, improved lubrication, comprises a highly compact piece of equipment which requires but little space as it employs a single drive means.

Figure 3:
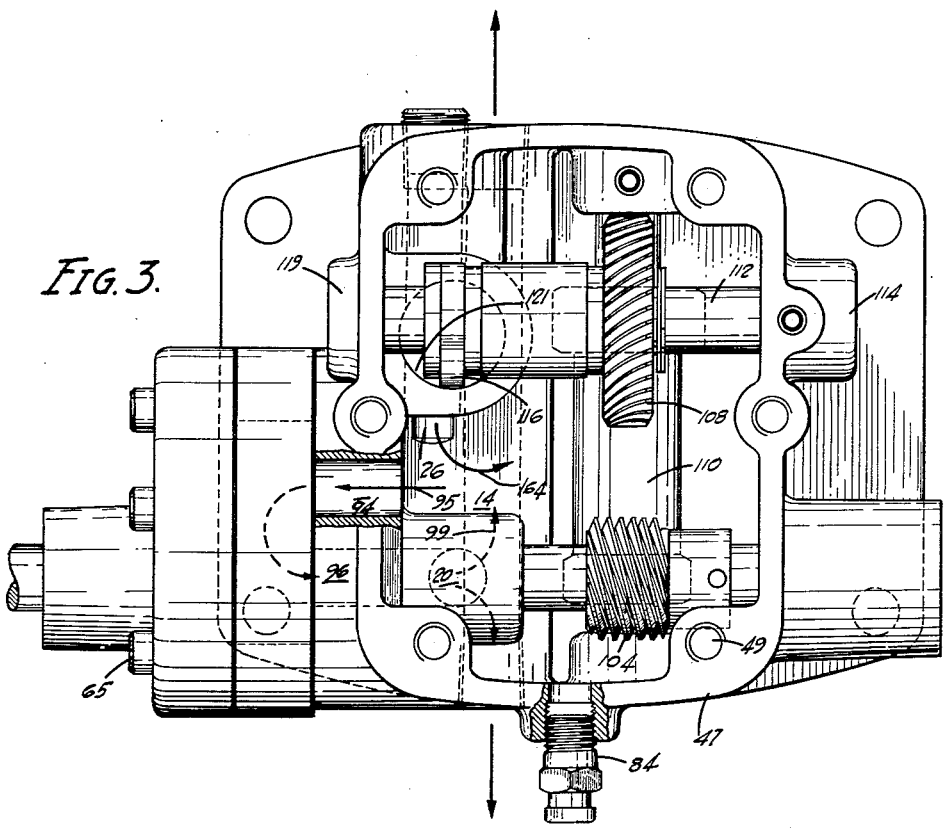
FIG. 3 is a top plan view of the combined pump and timer structure shown in FIG. 1 with the reservoir removed.
Figure 2:
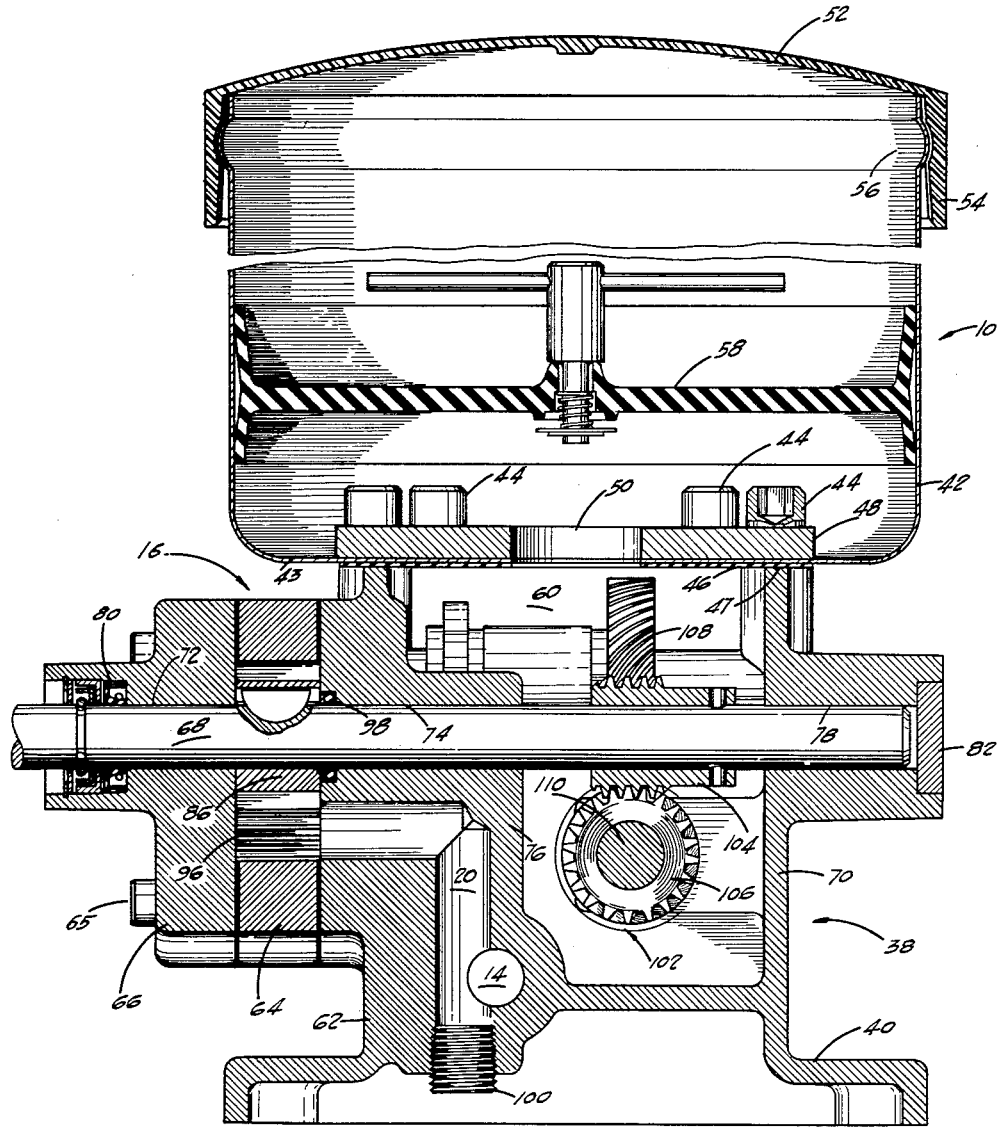
FIG. 2 is a front elevational view, in section, of the combined pump and timer employed in the present invention.
Figure 4:
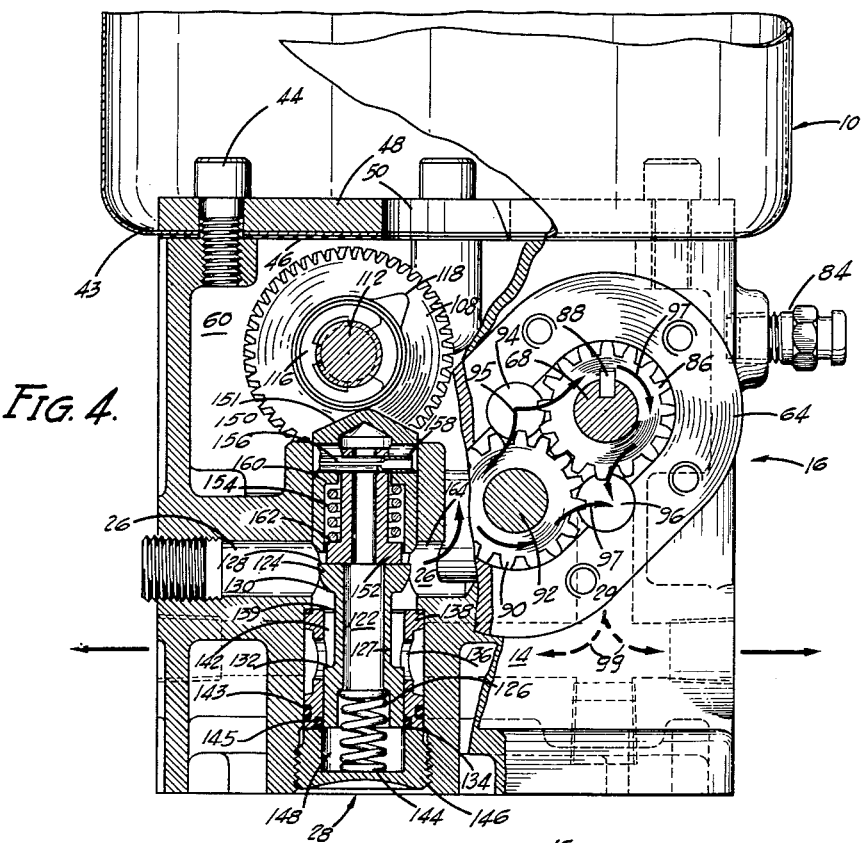
FIG. 4 is a left-side elevational view, partially in section, of the apparatus shown in FIG. 1.

Looking to FIG. 2, there is shown the main pump and timer housing 38 which may be formed of cast metal or the like. The housing 38 includes a base portion 40 which may be suitably mounted on any support means. Positioned atop the main housing 38 is a sheet-metal lubricant reservoir 10 which includes a reservoir body 42. The lower or bottom wall 43 of the reservoir body 42 is secured to the housing 38 by a number of bolts 44 which are screwed into suitable threaded holes 49 formed in the upper surface 47 of the main housing as indicated in FIG. 3. A gasket member 46 is interposed between the surface 47 and the bottom wall 43 of reservoir 10. In order to insure that there will be no leaks between the reservoir 10 and the main housing 38, there is provided, a generally rectangular plate 48 which is secured to the upper surface of the bottom wall 43 of the lubricant reservoir 10 to aid in securely positioning the reservoir 10 upon the main housing as well as to insure adequate sealing between the two units. Suitable apertures 50 are formed within the plate 48, the bottom wall 43 of reservoir 10, and gasket 46, such that the liquid lubricant may flow freely to and from the main housing 38. The reservoir 10 further includes an open top portion which is covered by a somewhat flexible cover 52. The upper portion of the reservoir 10 terminates in an outwardly directed lip portion 56 which runs completely around the upper wall of the reservoir. This lip 56 is adapted to receive an embossed flange 54 formed at the outer periphery of the cover 52 so as to securely hold the cover on the reservoir. At the same time, the cover may be easily removed for cleaning or repair purposes. Positioned within the interior of the reservoir 10, is a resilient diaphragm 58 which is adapted to move in a vertical direction in a conventional manner under the influence of the lubricant which rises and falls within the reservoir. As shown in FIGS. 3 and 4, there is provided a lubricant supply valve 84 which allows the lubricant to be deposited in the reservoir 10 after first passing through cavity 60 located within the main housing 38, the lubricant rising through the aperture 50 prior to filling the reservoir 10 and forcing the diaphragm 58 to move upwards as the level of lubricant rises.

The main timer and pump housing 38 comprises a three-part structure including a control valve support portion 62, a gear-pump support 64 and an end plate 66. The intermediate pump support portion 64 is secured to one end of the larger control valve support portion 62 by means of a plurality of longitudinally extending bolts 65 which extend through portions 64 and 66. A single main drive shaft 68 is supported by all three housing portions, and as shown in FIG. 2, passes through portions 66 and 64 to terminate within outer wall 70 of the control valve support portion 62. As such, the main drive shaft is supported on journal bearing surface 72 formed within end plates 66, bearing surface 74 formed within the inner wall 76 of the control valve support portion 62 and journal bearing surface 78 formed within wall 70. The main drive shaft is connected to the apparatus to be lubricated (not shown) and is driven thereby. In order to retain the lubricant within the housing and to insure against any leakage along the bearing surfaces, sealing means are provided at 80 and 82 on either end of the main drive shaft.

The positive-type, continuously driven gear pump 16, which is best seen in FIGS. 2 and 4, includes a main drive gear 86, which is keyed to the main drive shaft 68 by means of suitable key means 88. The driven gear 90 is rotatably mounted upon a stationary shaft 92, such that its teeth engage the teeth of the drive gear and provide a positive pump arrangement. As such, the lubricant enters inlet passageway 94 as shown by arrows 95, FIGS. 3 and 4, where it divides, passing around the outside of both gear teeth which revolve in opposite directions, where it again combines as indicated by the arrows 97 and passes through the outlet passageway 96 where it enters the outlet conduit 20, FIG. 2, passing into main lubricant supply line 14 where it moves in either of two directions as indicated by the dotted arrows 99 in FIG. 4 to suitable conduit means (not shown) where it is distributed to the various machine elements to be lubricated. A suitable plug 100 is screwed into the bottom of conduit 20, the plug 100 being removable to allow the apparatus to be cleaned.

The present invention provides a compact single unit whereby the lubricant may be pressurized and delivered at timed intervals to the various machine elements to be lubricated. Associated with the pump means, is the control valve assembly 28 which is intermittently operated to effect lubrication of the machine elements. To cyclically operate this valve there is coupled to the main drive shaft 68 a control valve timing and speed reduction gear train 102. The gear train 102 includes the drive shaft gear 104, an intermediate gear 106 which is rotatably mounted upon a suitable stationary shaft 110. A second intermediate gear (not shown) rotates with the gear 106 on shaft 110. A cam shaft timing gear 108 rotatably mounted on a stationary cam shaft 112 is driven by the second intermediate gear. The cam shaft 112 is suitably mounted in bosses 114 at either end. As indicated in FIGS. 3 and 4, a cam 116 rotates with gear 108 on the cam shaft 112. The cam 116 includes a single cam lobe 118 for operating the control valve.

Figure 5:
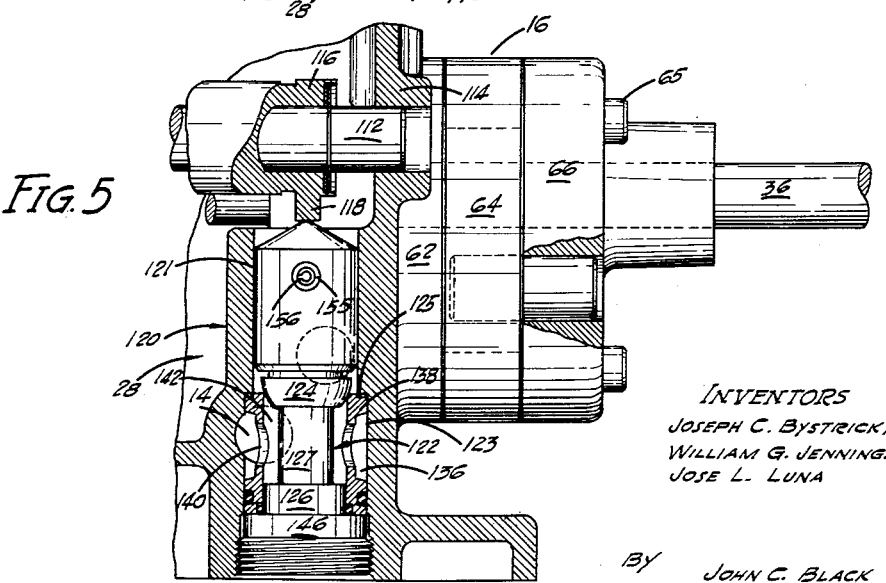
FIG. 5 is a rear elevational view, partially in section, of a portion of the apparatus shown in FIG. 2.

The control valve assembly 28 includes a generally cylindrical bore 120 which extends along a generally vertical line, being spaced slightly away from the gear pump assembly. The cylindrical bore 120 actually forms part of the bypass line 26. As indicated in FIGURES 4 and 5, the bore 120 includes a somewhat smaller internal diameter portion 121 which opens up into a slightly larger diameter portion 123 at the lower end thereof. Intermediate of these two portions, there is formed a shoulder 125 which acts as a stop for the generally cylindrical valve guide member 138 positioned within the larger diameter portion 123 of bore 120. The cylindrical valve guide member 138 is secured within bore 120 by means of a plug 146 which is in threaded engagement with the lower portion of the housing. The upper end of the valve guide member 138 forms a valve seat surface 139. A reciprocating, spool-type valve 122 is adapted to move longitudinally of bore 120 partially within the valve guide member 138. The spool-type valve 122 includes upper and lower lands 124 and 126, respectively, which are separated by an intermediate reduced diameter portion 127. The lower land 126 is adapted to reciprocate within the guide member while the upper land 124 moves within bore 120 to seat and unseat on valve seat surface 139. The upper land 124 tapers outwardly slightly away from the reduced diameter portion 127 to form an upper fluid contact surface 128 and a lower fluid contact surface 130 upon this land. The land 126 includes a uniform diameter throughout its length and has formed an upper fluid contact surface 132 and a lower fluid contact surface 134. It is to be noted that the effective fluid pressure surface area of the upper land is just slightly greater than that of the lower land 126. A suitable inlet cavity 136 is formed within the large diameter portion 123 of bore 120 between the bore 120 and the cylindrical valve guide member 138 to receive the lubricant from supply line 14. The lubricant then moves through suitable apertures 140 formed within the guide member 138 where it fills the cavity 142 intermediate of lands 124 and 126. In order to effectively seal the reciprocating valve 122 and the valve guide member 138 within the bore 120, there is provided suitable O-rings 143 and 145. A helical compression spring 144 is positioned intermediate of the end plug 146 and the spool-type valve 122 to bias the spool-type valve toward an open or unseated position. The particular spool-type valve used in the present system, results in a generally fluid pressure balanced arrangement regardless of whether the valve is fully seated or fully open. For instance, when the spool-type valve is in the open position such as when the lubricant is returning to the reservoir for recirculation through the continuously driven gear pump 16, the pressure within the supply line control valve is approximately atmospheric, that is, a pressure which is determined only by the lubricant head within reservoir 10. As such, the lubricant pressure is being applied to all four contact surfaces 128, 130, 132, and 134 of the valve 122, as it readily finds its way from the by-pass line 26 past the upper surface and through the hollow spool-like valve 122. As a result, all of the fluid pressure forces are approximately cancelled out and the biasing pressure from spring 144, in effect, keeps the valve in the open position. When the spool-like valve is closed, by the intermittent operation of the timer cam 116, the pressure within the lubricant supply line immediately builds up since the liquid or fluid lubricant no longer can return to the reservoir, and a high pressure force is exerted only against the surfaces 130 and 132 on the two lands 124 and 126, respectively. O-ring 145 prevents pressurized lubricant from reaching surface 134 at the bottom of the valve 122. However, the forces are nearly in equilibrium, but since the effective diameter of the upper land 124 is slightly greater than the effective diameter of land 126, there is a slight unbalanced pressure tending to move the spool-like valve 122 off its seat 139. However, under normal conditions this pressure is ineffective since the valve is being urged in its closed position by the positive-acting cam 118 which operates to keep the valve 122 in the closed position.

Incorporated with this particular type valve, is another feature of the present invention. The control valve 122 in reality forms a threefold purpose, two of which are readily apparent. That is, control valve 122 acts to pressurize the fluid within the supply line 14 at a time when the apparatus is to be lubricated, while at the same time acting as a means to initiate the operation of the metering valves associated with each of the bearings to be lubricated. An additional function of the present compact valve arrangement is that of allowing the high pressure fluid within the lubricant supply line 14 to be exhausted into the reservoir if the pressure exceeds a predetermined set value even though the cam is in the full contact position with the cam follower. This function is provided by use of an intermediate element 152 which is positioned between the cam follower 150 and the spool-type valve 122. The cam follower 150 comprises a generally cup-shaped element which is adapted to slide in an inverted fashion within the upper portion 121 of valve bore 120. The cam follower 150 has a generally pyramidal-shaped base 151 which is adapted to contact the cam lobe 18 as the cam rotates around the axis of the shaft 112. A bore is drilled transversely through the upper portion of the intermediate element 152, and another smaller bore is drilled in the cam follower 150 such that a C-ring pin 156 may be inserted through the larger bore and pressed into the smaller bore. This enables the cam follower 150 and the intermediate element 152 to be loosely secured so that limited relative axial movement may occur. A helical compression spring 154 having a relatively large spring constant surrounds the cylindrical intermediate element 152 and is positioned within the cam follower 150. One end of spring 154 contacts flange 160 formed on the inner surface of the cup-shaped cam follower 150 while the other end of spring 154 is in contact with shoulder 162 formed in the intermediate element 152. Thus, as the cam 116 rotates, and the cam lobe 118 contacts the cam follower 150, a force is exerted downwardly through the cam follower 150 to the intermediate element 152 which is seated fully against the top surface 128 of valve spool 122. This force is resisted by the helical spring 144 located at the extreme end of the reciprocating valve 122. It is apparent therefore that instead of having an inflexible contact means from cam 116 to the spool, there is provided an intermediate resilient support such that the spool 122 may move slightly with respect to the cam follower by mere compression of the helical spring 154. Normally, the helical spring 154 will exert sufficient force to keep the intermediate element 152 extended away from the cam follower 150. This occurs because the spring constant of compression spring 154 is somewhat greater than the spring constant of compression spring 144. However, when the spool-shaped valve 122 is in the fully closed position, and full line pressure is being exerted within cavity 142 against the upper and lower land, there may be some undesired pressure fluctuation which will cause an extremely high pressure to be present within the lubricant supply line. Since these pressure fluctuations are transmitted directly to the cavity 142 intermediate of the lands, the force exerted by the fluid on the valve 122 will vary. As noted previously, the effective diameter of the upper land is slightly larger than the sealing diameter of the lower land and a very small unbalance force is present tending to move the spool-shaped valve 122 upwardly against the spring bias of spring 154. Under normal circumstances, this force is insufficient to cause the valve to unseat, however, should a severe pressure increase occur within the lubricant supply line, the force, being proportional, rises to cause the intermediate element 152 to be moved upwardly toward the cup-shaped cam follower against the compression spring bias 154. Of course this movement is minute and is only to the extent whereby the transverse C-ring pin 156 engages the upper surface of the transverse bore in the cam follower 150, but it is sufficient to allow the valve 122 to unseat slightly so as to vent the high pressure lubricant from the supply line 14 into the reservoir 10 through the vent port 26. This movement of lubricant from the high pressure supply lin into the reservoir is indicated by the arrow 164, FIG. 4. After the pressure within the line drops, the compression spring 154 will force the valve seat closed if the cam lobe 118 is in the full contact position upon the upper surface 151 of the cam follower 150. It is therefore apparent, that this feature acts purely as a safety measure. However, the feature has one great advantage in that the safety arrangement is incorporated within the control valve, and aids in providing a highly compact simplified piece of equipment.

While there have been shown and described and pointed out fundamental novel features of the invention as applied to the preferred embodiment, it will be understood that various omissions and substitutions and changes in the form and details of the device illustrated and in its operation may be made by those skilled in the art without departing from the spirit of the invention. It is the intention, therefore, to be limited only as indicated by the scope of the following claims.

What is claimed is:

1. A combined pump and timer apparatus for a centralized lubrication system for periodically lubricating a machine element from a reservoir having a supply of lubricant including a supply line for connecting said reservoir with said machine element, and a measuring valve positioned between said supply line and said machine element, said measuring valve being operated by increased pressure within said supply line to deliver a measured quantity of lubricant to said machine element, said apparatus comprising: a positive-type, continuously driven pump for removing lubricant from said reservoir and delivering said lubricant to said supply line, a bypass line connecting said supply line and said reservoir for allowing return flow of lubricant from said supply line to said reservoir, a control valve in the by-pass line, resilient biasing means tending to bias said control valve toward an open position, supply line pressure responsive control valve surface means slightly biasing said control valve toward an open position when said control valve is in a closed position, positive acting means tending to periodically close said control valve for predetermined time intervals to allow fluid pressure to build up within said supply line, and resilient connection means between said positive valve-acting means and said control valve for allowing limited movement between said control valve and said positive-acting closing means to prevent lubricant pressures in the supply line higher than a predetermined value.

2. Apparatus as claimed in claim 1 wherein said control valve is of the reciprocating type, and said positive-acting valve closing means comprises a rotatable cam, and a cam follower positioned between said cam and said control valve, said resilient connection means being located between said cam follower and said reciprocating valve.

3. Combined pump and timer apparatus for an automatic lubrication system wherein a machine element is periodically lubricated, said system including a reservoir having a supply of lubricant therein, a supply line for connecting said reservoir with said machine element, and a measuring valve positioned between said supply line and said machine element, said measuring valve being operated by increased pressure within said supply line to deliver a measured quantity of lubricant to said machine element, said apparatus comprising: a positive-type, continuously operating pump position between said reservoir and said supply line for delivering lubricant to said supply line, a bypass line connecting said supply line and said reservoir for allowing the return flow of lubricant from said supply to said reservoir, a reciprocating, spool-type valve positioned between said supply line and said bypass line, surface means on the spool-type valve responsive to lubricant pressure in the supply line biasing said valve toward an open position, a continuously rotating cam tending to periodically close said valve for predetermined time intervals to increase the pressure in said supply line, a cam follower positioned between said rotating cam and said spool-type valve, means for resiliently coupling said cam follower and said valve, said cam tending normally to periodically close said valve but said resilient coupling means allowing said valve surface means to open the valve slightly upon excessive pressure rise within said supply line regardless of the position of said cam.

4. A combined pump and timer for an automatic lubrication system for periodically lubricating a machine element, said system including a reservoir having a supply of lubricant therein, a supply line for connecting said reservoir with said machine element, and a measuring valve positioned between said supply line and said machine element, said measuring valve being operated by increased pressure within said supply line to deliver a measured quantity of lubricant to said machine element, said apparatus comprising: a positive-type, continuously operating pump positioned between said reservoir and said supply line for delivering lubricant to said supply line, a bypass line connecting said supply line and said reservoir for allowing the return flow of lubricant from said supply line to said reservoir, said bypass line including a generally cylindrical, enclosed bore, a valve guide member positioned within said bore, a valve seat formed on one end surface of said valve guide, a generally cylindrical, spool-type valve mounted within said guide member for reciprocatory movement therein, a pair of lands formed at either end of said valve forming a reduced diameter portion intermediate of said lands to define a lubricant-receiving cavity between said lands, said cavity being in fluid connection with said supply line, the effective diameter of the land adjacent said valve seat being slightly larger than the effective diameter of said other land within said valve guide member, whereby a slight force is developed tending to open said valve when said valve is in the closed position, resilient means also tending to bias said valve in the open direction, and means operable periodically to close said valve to build up fluid pressure within said supply line.

5. Apparatus as claimed in claim 4 wherein said means for periodically closing said control valve comprises a continuously driven, positive acting cam tending to close said valve, an inverted, generally cup-like cam follower positioned adjacent said rotating cam, within said bore and adapted to move axially toward said reciprocating valve and in line therewith, an intermediate member positioned co-axially within said cup, one end of said intermediate member contacting said reciprocatory spool-like valve, resilient means positioned between said cup-like cam follower and said intermediate member, said resilient means tending to force said cam follower and said intermediate member away from each other, whereby contact of said cam with said cam follower normally causes said spool-like reciprocating valve to close, but under excessive pressure within said supply line, said intermediate member moves toward said cam follower regardless of the position of said cam to allow said high pressure lubricant within said supply to return to said reservoir through said bypass line.

6. In an automatic lubrication system having a reservoir including a supply of lubricant therein, a supply line for connecting said reservoir with said machine element, a measuring valve positioned between said supply line and said machine element, said measuring valve being operated by increased pressure within said supply line to deliver a measured quantity of lubricant to said machine element, positive pump means for removing lubricant from said reservoir and delivering said lubricant to said supply line, and a bypass line for allowing the return flow of lubricant from said supply to said reservoir, control means comprising: a control valve positioned within said bypass line for controlling the return flow of lubricant, positive acting means tending to close said valve periodically, first resilient means tending to bias said control valve toward an open position, second resilient means positioned between said positive-acting valve closing means and said control valve, and fluid pressure biasing means tending to slightly bias said control valve toward an open position when said control valve is completely closed, said positive-acting valve closing means acting to close said control valve periodically against said first resilient biasing means under normal circumstances, but whenever the fluid pressure within said supply line exceeds a predetermined value, said fluid pressure biasing means associated with said valve acts to overcome said second resilient means, whereby said lubricant is vented to said reservoir through said bypass regardless of the position of said positive-acting valve closing means.

7. A combined pump and timer apparatus for a centralized lubrication system for periodically lubricating a machine element from a reservoir having a supply of lubricant therein, a supply line for connecting said reservoir with said machine element and a measuring valve positioned between said supply line and said machine element, said measuring valve being operated by increased pressure within said supply line to deliver a measured quantity of lubricant to said machine element, said apparatus comprising: a positive-type, continuously driven, pump for removing lubricant from said reservoir and delivering said lubricant to said supply line, a bypass line connecting said supply line and said reservoir for allowing retturn flow of lubricant from said supply line to said reservoir, a control valve positioned within said bypass line for controlling said return flow, resilient means for biasing said control valve toward an open position, automatic cam and spring mechanism periodically overcoming said resilient biasing means to close said control valve, whereby fluid pressure is built up within said supply line, and fluid pressure-responsive surface means on said valve tending to bias said valve in a valve-open position and responsive to a selected fluid pressure to overcome said cam and spring mechanism whereby said high pressure fluid within said supply line will be vented regardless of the position of said automatic means.

8. In a centralized lubrication system of the type in which a continuously operated pump delivers lubricant from a reservoir having a supply of lubricant to a supply line under pressure, in which a by-pass line connects the supply line and the reservoir for return of lubricant to the reservoir, in which a control valve is operated ot periodically close the by-pass line to permit lubricant pressure to build up within the supply line, and in which a measuring valve connected to the supply line delivers measured quantities of lubricant to a machine element for periodic lubrication thereof incident to each operation of the control valve, the combination with the control valve of yieldable mechanical structure engaging and closing the valve for predetermined timed intervals independent of lubricant pressure, said control valve including surface means of unequal areas to pressure bias said control valve against said yieldable structure, said control valve surface means being responsive to supply line pressure overcoming the mechanical structure at a predetermined pressure to prevent excessive supply line pressures.

9. In a centralized lubrication system of the type in which a continuously operated pump delivers lubricant from a reservoir having a supply of lubricant to a supply line under pressure, in which a by-pass line connects the supply line and the reservoir for return of lubricant to the reservoir, in which a control valve is operated to periodically close the by-pass line to permit lubricant pressure to build up within the supply line, and in which a measuring valve connected to the supply line delivers measured quantities of lubricant to a machine element for periodic lubrication thereof incident to each operation of the control valve, the combination with the control valve of a mechanism including a cam and a high power spring engaging and closing the valve for predetermined timed intervals independent of lubricant pressure, said control valve including surface means of unequal areas to pressure bias said control valve against the cam and spring mechanism said control valve surface means operative to cause limited movement of the control valve from closed position at supply line pressures above a predetermined high value for preventing excessive supply line pressures.

References Cited in the file of this patent
UNITED STATES PATENTS

| | | |
|---|---|---|
| 1,979,370 | Davis | Nov. 6, 1934 |
| 2,145,245 | Bijur | Jan. 31, 1939 |
| 2,278,452 | Kocher | Apr. 7, 1942 |
| 2,733,732 | Baker | Feb. 7, 1956 |

FOREIGN PATENTS

| | | |
|---|---|---|
| 239,475 | Great Britain | of 1926 |